(12) United States Patent
Favre et al.

(10) Patent No.: US 12,066,792 B2
(45) Date of Patent: Aug. 20, 2024

(54) SMART AUTOMATIC WATCH WINDING-MECHANISM WITH WATCH IDENTIFICATION

(71) Applicant: The Swatch Group Research and Development Ltd, Marin (CH)

(72) Inventors: Jérôme Favre, Neuchâtel (CH); Matthias Imboden, St-Blaise (CH); Romano Cristoni, Sonceboz (CH); Stefan Kalbermatter, Grenchen (CH)

(73) Assignee: The Swatch Group Research and Development Ltd, Marin (CH)

( * ) Notice: Subject to any disclaimer, the term of this patent is extended or adjusted under 35 U.S.C. 154(b) by 402 days.

(21) Appl. No.: 17/399,692

(22) Filed: Aug. 11, 2021

(65) Prior Publication Data

US 2022/0146983 A1    May 12, 2022

(30) Foreign Application Priority Data

Nov. 12, 2020  (EP) .................................. 20207283

(51) Int. Cl.
*G04B 3/00*  (2006.01)
*G04B 5/00*  (2006.01)
(Continued)

(52) U.S. Cl.
CPC .............. *G04B 3/006* (2013.01); *G04B 5/00* (2013.01); *G06F 16/635* (2019.01);
(Continued)

(58) Field of Classification Search
CPC . G04B 3/006; G04B 5/00; G04B 5/02; G04D 7/004; G04D 7/009; G04D 7/1242;
(Continued)

(56) References Cited

U.S. PATENT DOCUMENTS

2012/0026845 A1*  2/2012  Richard ................. G04B 15/14
368/127
2018/0181075 A1*  6/2018  Born ...................... G04D 7/003
(Continued)

FOREIGN PATENT DOCUMENTS

DE     10 2009 034 109 B3   11/2010
EP         3 096 191 A1     11/2016
(Continued)

OTHER PUBLICATIONS

European Search Report for EP 20 20 7283 dated Apr. 20, 2021.

*Primary Examiner* — Edwin A. Leon
*Assistant Examiner* — Sean R Brannon
(74) *Attorney, Agent, or Firm* — Sughrue Mion, PLLC

(57) ABSTRACT

Winding device (1000) including motorisation means (2) driving a watch holder (1) carrying at least one automatic watch (100) with a movable oscillating mass, and measuring means (3) measuring the amplitude of the resonator of each watch (100), and watch (100) identification means (300), providing the identification of a particular watch (100) to control means (200) including an internal database (400) with the history of the amplitude measurements of the resonator of this particular watch (100) and/or the value of its nominal amplitude, and/or communication means (500) communicating with an external database (600) for extracting these values.

13 Claims, 2 Drawing Sheets

(51) Int. Cl.
*G06F 16/635* (2019.01)
*G06V 10/20* (2022.01)
*G06V 10/44* (2022.01)
*H04B 5/72* (2024.01)

(52) U.S. Cl.
CPC ............ *G06V 10/255* (2022.01); *G06V 10/44* (2022.01); *H04B 5/72* (2024.01)

(58) Field of Classification Search
CPC .... G06F 16/635; G06V 10/44; G06V 10/255; H04B 5/0031
See application file for complete search history.

(56) References Cited

U.S. PATENT DOCUMENTS

2018/0341225 A1* 11/2018 Favre .................... A44C 5/0007
2018/0341226 A1* 11/2018 Favre .................... G04B 18/021

FOREIGN PATENT DOCUMENTS

| EP | 3 339 984 A1 | 6/2018 |
| EP | 3 422 119 A2 | 1/2019 |
| JP | 2018-105858 A | 7/2018 |
| JP | 2018-200308 A | 12/2018 |
| WO | 2012/126978 A1 | 9/2012 |
| WO | 2016/184736 A1 | 11/2016 |

\* cited by examiner

SMART AUTOMATIC WATCH WINDING-MECHANISM WITH WATCH IDENTIFICATION

CROSS REFERENCE TO RELATED APPLICATIONS

This application is a Non-Provisional Application, claiming priority based European Patent Application No. 20207283.1 filed Nov. 12, 2020.

FIELD OF THE INVENTION

The invention relates to a winding device for an automatic watch with a movable oscillating mass, including at least one watch holder arranged to carry an automatic watch, and including control means arranged to control motorisation means for driving said at least one watch holder for winding a said watch, said device including measuring means, interfaced with said control means, and which are arranged to measure the amplitude of the resonator of a watch based on the coiling performed by said motorisation means.

The invention relates to the field of smart devices, such as smart winding-mechanisms, for maintaining watches in immediate serviceability, displaying the correct time, and with sufficient power reserve to be worn for a few hours, while at the same time avoiding premature wear of the watch by incessant and unnecessary windings.

BACKGROUND OF THE INVENTION

Most watch winding-mechanisms in the trade contain virtually no smart function and a priori have little reason to recognise the watch placed.

In recent smart winding-mechanisms, and in particular described in documents EP2650735, EP3096191, EP3163381, EP3339984, EP3572887, EP3719589, EP19215629.7, in the name of THE SWATCH GROUP RESEARCH & DEVELOPMENT Ltd, the winding of automatic watches is stopped at the latest when the watch is completely wound up, or even a little earlier, in order to prevent wear of the barrel drum due to the friction of the sliding flange. These devices are subject to constant improvement.

In particular, one of the developments relates to a smart winding-mechanism, based on limiting the unnecessary winding of automatic watches, and whose main purpose is to limit the recharging of the automatic barrel of the watch to what is strictly necessary, to avoid any premature wear of the watch, following excessive winding.

This family of smart winding-mechanisms measures the frequency of the balance-spring, as well as the coiling condition of the barrel, so as to wind the watch only as much as is necessary to avoid premature wear of the mechanical movement.

The coiling state of the barrel is measured indirectly via a measurement of the amplitude of the balance-spring. This amplitude measurement is not absolute, but relative: it is sought above all to determine whether the winding of the watch actually coils it or not, or the watch is fully coiled or not.

To identify whether a watch is fully charged, the amplitude of the balance-spring is advantageously measured by an acoustic method of the escapement noises, carried out by proximity or contact microphone, because these noises allow to estimate the amplitude of the balance-spring, itself representative of the coiling of the barrel. However, it remains difficult to make an accurate and reliable measurement of the amplitude, due to the background noise, at a reasonable cost, and with low power consumption. In addition, for optimal accuracy, this method requires contact with the measured watch, or at least the installation of an air microphone very close to the resonator of the watch, in a low-noise environment.

The difficulty lies in obtaining a correct value for the amplitude of the balance-spring regardless of the watch and regardless of the type of escapement (Swiss anchor, coaxial or the like).

This problem is difficult to solve in a perfectly satisfactory manner. A good practical solution is to measure the variation in amplitude rather than its absolute value. When the watch is fully coiled, the amplitude stops increasing. The winding-mechanism then servo-controls the amplitude to a certain fraction of the maximum amplitude measured (for example 80%). This method requires waiting for the amplitude to stabilise at a relatively high value, which is difficult to detect because the amplitude measurement is very noisy. This waiting duration can be long, and the winding-mechanism can wind the barrel to the point that the flange slips, then causing wear. A good method consists in equipping the winding-mechanism with acoustic means arranged to identify a reference snap noise between the sliding flange of the barrel and the relief of the latter. It is also advantageous to equip the winding-mechanism with measuring means designed to measure the variation of the resistive torque which is opposed to its motorisation means. These different arrangements allow good control of the monitoring of the amplitude variation.

The fact that the absolute value of the amplitude is not known, however, makes a useful function impossible: that of signalling to the Customer that his watch has a low absolute amplitude, therefore that it has wear and would need a return to after-sales service or to the factory.

In short, for a particular watch, it is useful to be able to determine its nominal amplitude, either with reference to measurements made when the watch is new, or with reference to factory or public databases.

SUMMARY OF THE INVENTION

The invention proposes to develop methods for recognising a watch placed on a smart winding-mechanism, in order to optimise its operation, by accessing, through the identification of a particular watch, its own history or a database determining its nominal amplitude.

To this end, the invention relates to a winding device for an automatic watch with a movable oscillating mass, according to claim 1.

The invention relates to the field of smart winding-mechanisms, for maintaining watches in immediate serviceability, displaying the correct time, and with sufficient power reserve to be worn for a few hours, or for accelerated recoiling of a watch, while respecting the integrity of the watch and its preservation in terms of wear.

BRIEF DESCRIPTION OF THE DRAWINGS

Other features and advantages of the invention will become apparent upon reading the detailed description which follows, with reference to the appended drawings, where.

DETAILED DESCRIPTION OF THE PREFERRED EMBODIMENTS

Figure 1:
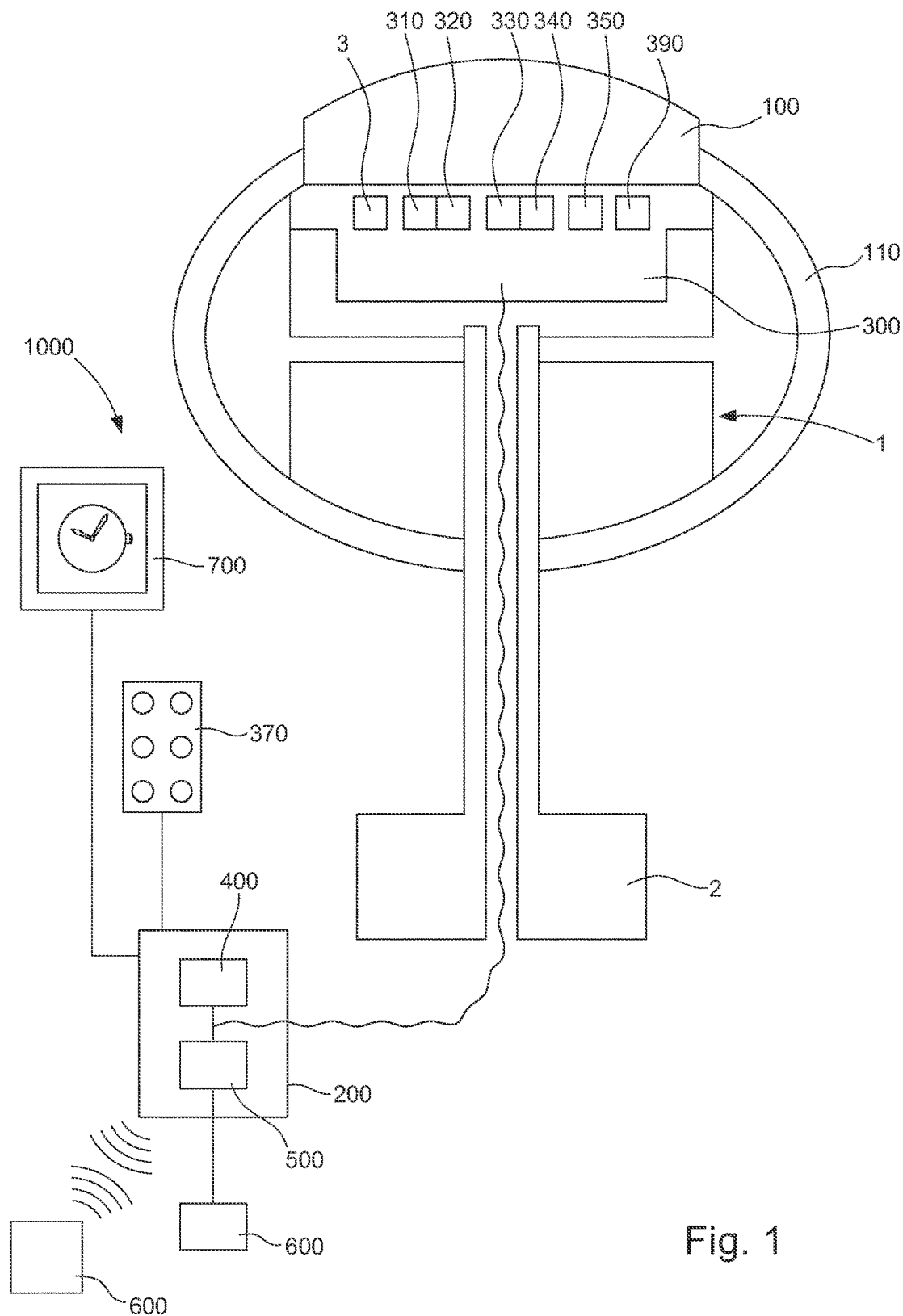
FIG. 1 shows, schematically, and partially, no fairing being shown, a winding device according to the invention, for an automatic watch with a movable oscillating mass, bearingly fixed on a motorised watch holder; this device includes control means, to which are connected motorisation means for driving each watch holder (only one being shown in this figure), and for processing the various signals to and from means for measuring the amplitude of the resonator of a watch, and means for identifying each watch, which are here, in a particular non-limiting embodiment, shown on board the watch holder as the measuring means; these control means here include an internal database with the history of the amplitude measurements of the resonator of each particular watch and/or the value of its nominal amplitude, and also communication means communicating with an external database, such as a manufacturer's database or the like, and they also include interface and display means for the benefit of the user.
Figure 2:
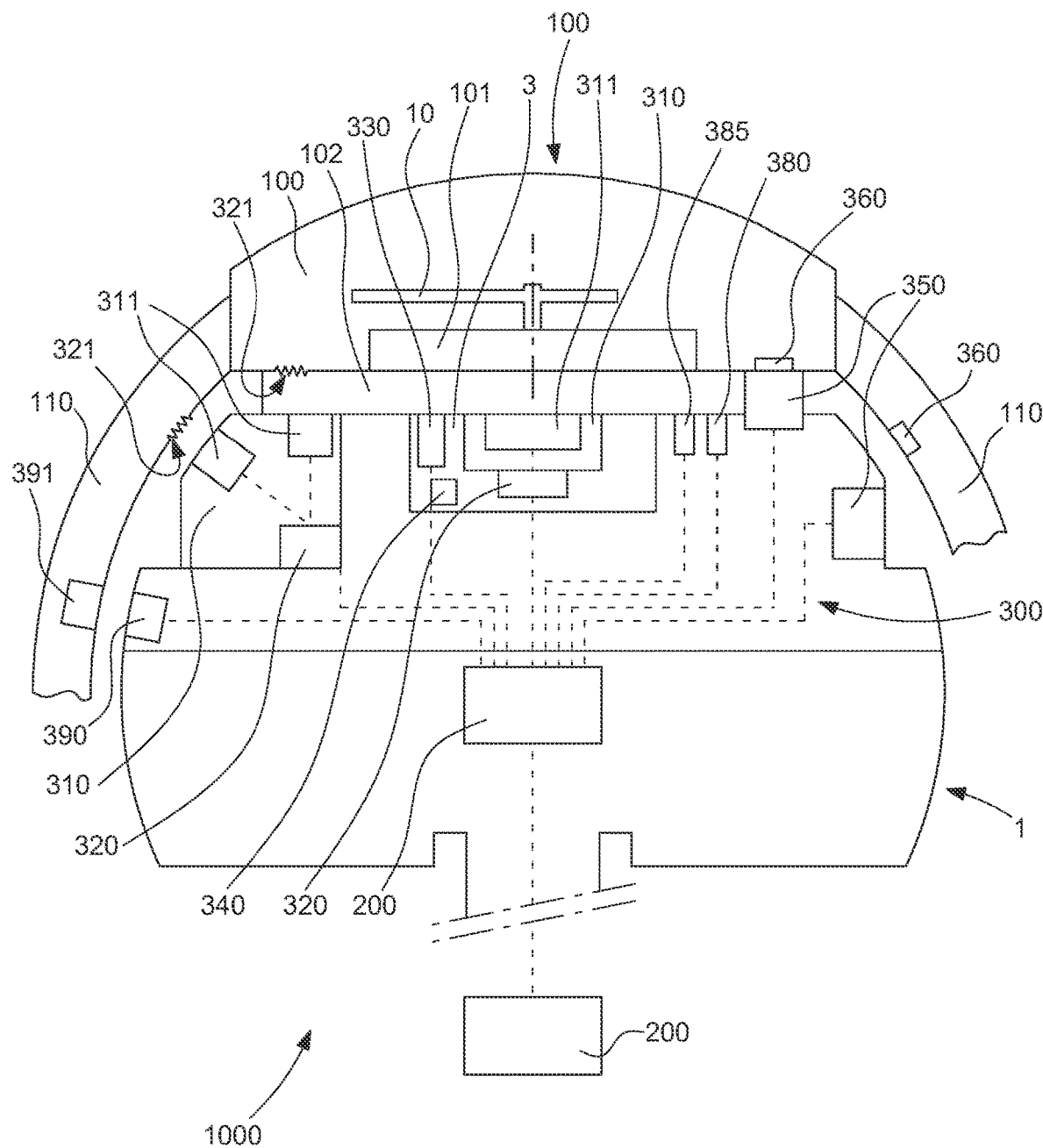
FIG. 2 shows, schematically, a detail of FIG. 1, an example of implantation of the various acquisition means in the watch holder, under the back of the watch, and arranged to cooperate with the watch or with its bracelet.

The invention relates to a winding device 1000 for an automatic watch 100 with a movable oscillating mass, including at least one watch holder 1 arranged to carry at least one such automatic watch 100, and including control means 200, which are arranged to control motorisation means 2 for driving at least one watch holder 1 for winding a watch 100.

This device 1000 includes measuring means 3, which are interfaced with the control means 200, and which are arranged to measure the amplitude of the resonator of a watch 100 based on the coiling performed by the motorisation means 2.

According to the invention, the winding device 1000 includes means 300 for identifying a watch 100, which are arranged to provide the control means 200 with the identification of a particular watch 100.

In the particular embodiment illustrated, which is not limiting, both the measuring means 3 and the identification means 300 are shown on board the watch holder 1. But naturally all or part of these different acquisition means can be placed outside a watch holder 1, and in particular in a casing enclosing the winding device 1000 according to the invention.

And the control means 200 include:
- an internal database 400 with the history of the amplitude measurements of the resonator of the particular watch 100 and/or the value of its nominal amplitude;
- and/or communication means 500, which are arranged to communicate with an external database 600 and to extract therefrom the nominal amplitude of the resonator of the particular watch 100 based on its identification, to determine the nominal amplitude of the watch 100 or the oldest maximum amplitude value in the history of the watch 100 if the nominal amplitude is unknown.

More particularly, the control means 200 are arranged to compare, on the one hand the maximum amplitude measured by the measuring means 3, and on the other hand the nominal amplitude or else the oldest maximum amplitude value in the history of the watch 100 if the nominal amplitude is unknown, to determine the wear of the watch 100.

Different variants are described below, which can be combined with one another. In these variants, an attempt is made to identify the watch 100 placed on the winding-mechanism, in order to consult a local database or on a remote server, in order to be able to recognise abnormal operation and the need for a return to after-sales service.

In a first variant, the identification means 300 include optical means 310, which are combined with shape recognition means 320, which are arranged to decipher a marking 321 of the watch 100 or of a bracelet 110 included in the watch 100, and/or to capture the contour in planar projection of the watch 100. These optical means 310 and these shape recognition means 320 are interfaced with the internal database 400 and/or the communication means 500 with the external database 600, in order to extract therefrom the nominal amplitude of the resonator of the watch 100 corresponding to the marking 321 and/or to the contour in planar projection.

More particularly, the at least one watch holder 1 includes a transparent support 102, on which bears the back 101 of the watch 100, and under which the optical means 310 include at least one camera 311, which is arranged to capture the image of the marking 321 of the watch 100 or of the bracelet 110, and/or the contour in planar projection of the watch 100.

More particularly, the optical means 310 are arranged to follow the oscillating mass 10 of a watch 100 carrying a transparent back 101, and such a camera 311 can be used to follow the movement of the oscillating mass 10, to determine the angular position of this oscillating mass 10 between a dead angle corresponding to the uncoiled state of the watch 100 and a limit coiling angle corresponding to the fully coiled state of the watch 100, and the optical means 310 are arranged to send a stop signal to the motorisation means 2 when this limit coiling angle is reached.

To implement this first variant with vision, it is possible to develop an application on a personal communication apparatus such as a mobile phone, "smartphone", or the like, to use the on-board camera in order to learn some features specific to a watch 100. It is not essential to identify the exact model, but above all to recognise it each time it is measured. It is then sufficient to observe the evolution of the amplitude measurement associated with this watch 100 over the years.

When the winding device 1000 includes at least one camera 311, this identification does not require a personal communication apparatus and can be performed directly on the winding-mechanism.

The equipment with shape recognition means 320, arranged to decipher a marking 321 of the watch 100 or of its bracelet 110, remains preferable for distinguishing two watches of the same model within a stock, or a collection, without user intervention.

In a second variant, the identification means 300 include acoustic means 330, which are combined with signal processing means 340 arranged to record the acoustic signature of the watch 100. These acoustic means 330 and these signal processing means 340 are interfaced with the internal database 400 and/or the communication means 500 with the external database 600 in order to extract therefrom the nominal amplitude of the resonator of the watch 100 corresponding to the acoustic signature. Each watch has a particular acoustic signature. However, it is necessary to have a high sensitivity of the acoustic means 330 and these signal processing means 340 in order to clearly distinguish two watches of the same model. It should be noted that the positioning of the watch 100 on the watch holder 1 also influences the acoustic signature. This method has the advantage of not requiring any additional components, and is completely transparent to the user.

In a third variant, the identification means 300 include near-field communication means 350, which are arranged to cooperate with complementary near-field communication means 360 to identify the watch 100. This near-field communication, also called NFC can, in particular, and easily implement, various self-adhesive NFC tags supplied with the winding-mechanism and/or with the watches. It is then sufficient for the user to apply such a self-adhesive tag, or the like, to each watch 100, for example on the back or on the bracelet 110. In a particular embodiment, such an NFC tag can be installed in the factory, glued, inserted, crimped, pad printed, or other, and directly protected by a protective element such as varnish, crystal, or the like, not disturbing the epidermis of the user. The winding-mechanism then includes an NFC antenna, which allows to identify the tag and associate it with a watch 100. This method is both very simple and very reliable. This third variant can easily be implemented at the bracelet 110 of the watch 100, instead of the watch 100 itself.

In a fourth variant, the identification means 300 and/or control means 200 include means for communication with the user 370, for the identification of the watch 100 by the user. The input of identification data by the user is a pragmatic solution: the winding-mechanism can simply ask the user, through the interface of a screen, a keyboard, a console, or a personal communication apparatus, to identify himself the measured watch 100. This can use any input system, such as a keyboard, a numeric keypad, touchscreen or even speech.

In a fifth variant, the identification means 300 include means for determining the mass 380 of the watch 100, for example including a strain gauge on board the watch holder 1 in order to differentiate between watches of a collection, of different models or at least including different bracelets 110 for watches of the same model. This fifth variant can be implemented at the bracelet 110 of the watch 100, instead of the watch 100 itself.

In a sixth variant, the identification means 300 include means for evaluating the amount of metal 385, to evaluate the amount of metal present on the watch holder 1, for example an analogue metal detector on board the watch holder 1, which can differentiate watches, or more particularly watches equipped with their bracelet 110, by measuring the amount of metal in front of it.

In a seventh variant, the identification means 300 include field measuring means 390, which are arranged to measure the intensity and/or the orientation of a field generated by a field generator 391, housed in the watch 100 or preferably in the bracelet 110. This field can be a permanent electrostatic field, generated by electrets embedded in the bracelet 110, and/or a permanent magnetic field, generated by at least one magnet housed in the bracelet 110; the dimensions, magnetisation, and orientation of each magnet can be different from one bracelet to another for the same watch model, which makes it easy to differentiate between two watches of the same model fitted with bracelets of the same shape.

The identification means 300 are advantageously arranged to determine the presence or absence of a watch 100 on at least one watch holder 1, and more particularly on each watch holder 1.

More particularly, the internal database 400 and/or the external database 600 includes the nominal amplitude of the resonator of the watch 100, and/or the maximum number of coiling turns recommended for the watch 100.

Advantageously, the winding device 1000 also includes display means 700, arranged to display for the benefit of the user or the public information relating to at least one watch 100 that he wears, and, more particularly, to every watch he wears, such as the watch model, date, rate evaluation, coiling level, or the like.

The main purpose of recognising the watch 100 on the winding-mechanism is to solve the problem of identifying ageing, and other features which are useful. For example, in a conventional winding-mechanism (without amplitude measurement), the maximum number of coiling turns can initially be programmed for each watch in a collection or stock, then recognise each of them with one of the above methods. This allows to limit wear on watches requiring few coiling turns, while preventing large watches from stopping over the long term. A useful precaution is to record, at the entry of each watch 100 in a collection or a stock, the number of coiling turns observed, and, when there is advantageously a winding-mechanism with amplitude measurement, to record at the same time the maximum amplitude measured.

The invention claimed is:

1. A winding device (1000) for an automatic watch (100) with a movable oscillating mass (10), including a watch holder (1) arranged to carry said automatic watch (100), and including control means (200) arranged to control motorisation means (2) for driving said watch holder (1) for winding said watch (100), said device (1000) including measuring means (3), interfaced with said control means (200), and which are arranged to measure an amplitude of a resonator of said watch (100) based on the coiling performed by said motorisation means (2) to provide amplitude measurements,
wherein said winding device (1000) includes means (300) for identifying said watch (100), which are arranged to provide said control means (200) with the identification of a particular watch (100), and
wherein said control means (200) include:
an internal database (400) with a history of the amplitude measurements of the resonator of said particular watch (100) and a value of a nominal amplitude of the resonator, if known, and/or
communication means (500) arranged to communicate with an external database (600) and to extract therefrom the history of the amplitude measurements of the resonator of said particular watch based on its identification and the value of the nominal amplitude of the resonator, if known, of said particular watch (100) based on its identification,
wherein the control means determines the nominal amplitude if the nominal amplitude is known and determines an oldest maximum amplitude value in the history of said watch (100) if the nominal amplitude is unknown.

2. The winding device (1000) according to claim 1, wherein said control means (200) are arranged to compare a maximum amplitude measured by said measuring means (3) and the oldest maximum amplitude value in the history of said watch (100) if the nominal amplitude is unknown, to determine the wear of said watch (100).

3. The winding device (1000) according to claim 1, wherein said identification means (300) include optical means (310), combined with shape recognition means (320) arranged to decipher a marking (321) of said watch (100) or of a bracelet (110) included in said watch (100), and/or to capture a contour in planar projection of said watch (100), said optical means (310) and said shape recognition means (320) being interfaced with said internal database (400) and/or said communication means (500) with said external database (600) in order to extract therefrom the nominal amplitude of the resonator of said watch (100) corresponding to said marking (321) and/or to said contour in planar projection.

4. The winding device (1000) according to claim 3, wherein said watch holder (1) includes a transparent support (102) supporting a back (101) of said watch (100), and under which said optical means (310) include a camera (311) arranged to capture an image of the marking (321) of said watch (100) or of a bracelet (110) included in said watch (100), and/or the contour in planar projection of said watch (100).

5. The winding device (1000) according to claim 4, wherein said optical means (310) are arranged to follow the oscillating mass (10) of said watch (100) carrying a transparent back (101), and to determine an angular position of said oscillating mass (10) between a dead angle corresponding to an uncoiled state of said watch (100) and a limit coiling angle corresponding to a fully coiled state of said watch (100), and in that said optical means (310) are arranged to send a stop signal to said motorisation means (2) when said limit coiling angle is reached.

6. The winding device (1000) according to claim 1, wherein said identification means (300) include acoustic means (330) combined with signal processing means (340) arranged to record an acoustic signature of said watch (100), said acoustic means (330) and said signal processing means (340) being interfaced with said internal database (400) and/or said communication means (500) with said external database (600) to extract therefrom the nominal amplitude of the resonator of said watch (100) corresponding to said acoustic signature.

7. The winding device (1000) according to claim 1, wherein said identification means (300) include near-field communication means (350) arranged to cooperate with complementary near-field communication means (360) to identify said watch (100).

8. The winding device (1000) according to claim 1, wherein said identification means (300) and/or said control means (200) include means for communication with a user (370) for the identification of said watch (100) by the user.

9. The winding device (1000) according to claim 1, wherein said identification means (300) and/or said control means (200) include field measuring means (390), which are arranged to measure an intensity and/or an orientation of a field generated by a field generator (391), housed in said watch (100) or in a bracelet (110) included in said watch (100), which field is a permanent electrostatic field, generated by electrets, or a permanent magnetic field, generated by a magnet housed in said bracelet (110).

10. The winding device (1000) according to claim 1, wherein said identification means (300) include means for determining a mass (380) arranged for determining a mass of said watch (100).

11. The winding device (1000) according to claim 1, wherein said identification means (300) include means for evaluating an amount of metal (385), arranged to evaluate the amount of metal present on said watch holder (1).

12. The winding device (1000) according to claim 1, wherein said identification means (300) are arranged to determine a presence or absence of a watch (100) on said watch holder (1).

13. The winding device (1000) according to claim 1, wherein said internal database (400) and/or said external database (600) includes the nominal amplitude of the resonator of said watch (100), and/or a maximum number of coiling turns recommended for said watch (100).

* * * * *